(12) United States Patent
Hagai

(10) Patent No.: US 6,508,289 B2
(45) Date of Patent: Jan. 21, 2003

(54) APPARATUS FOR MOLDING A LAMINATED ASSEMBLY

(75) Inventor: Tatsuro Hagai, Kanagawa-ken (JP)

(73) Assignee: Kasai Kogyo Co., Ltd., Kanagawa-ken (JP)

(*) Notice: Subject to any disclaimer, the term of this patent is extended or adjusted under 35 U.S.C. 154(b) by 14 days.

(21) Appl. No.: 09/785,446

(22) Filed: Feb. 20, 2001

(65) Prior Publication Data

US 2001/0027840 A1 Oct. 11, 2001

(30) Foreign Application Priority Data

Feb. 18, 2000 (JP) ........................................ 2000-041607

(51) Int. Cl.[7] ............................ B30B 15/04; B29C 43/20
(52) U.S. Cl. ........................ 156/443; 156/580; 425/520; 425/521; 425/400
(58) Field of Search ................................ 156/212, 222, 156/308.2, 443, 580; 425/398, 400, 126.1, 520, 521

Primary Examiner—Michael W. Ball
Assistant Examiner—Barbara J. Musser
(74) Attorney, Agent, or Firm—Dickstein Shapiro Morin & Oshinsky, LLP

(57) ABSTRACT

A surface skin holding means in a lower mold for holding a folded part of a surface skin member includes a planar support frame and a support post for supporting it and prevents the folded part from a load by elevation of the support post with the elevation of an ejector plate. Also, when the support post moves upward to the uppermost position at the support frame, the support post is retained with a support-post retaining means including ball plungers to facilitate placing the surface skin member.

2 Claims, 9 Drawing Sheets

APPARATUS FOR MOLDING A LAMINATED ASSEMBLY

BACKGROUND OF THE INVENTION

1. Field of the Invention

The present invention relates to a method for molding a laminated assembly and apparatus in which a surface skin member is integrally attached to the surface of a resin core member and having a folded part at a peripheral rim of the surface skin member, and more particularly, to a method for molding a laminated assembly and apparatus in which no load is applied to the folded part of the surface skin member when pushing up the laminated assembly, thereby reliably preventing the surface skin member from being peeled off, and consequently having a good appearance.

2. Description of the Related Art

FIG. 10 shows the structure of an automobile door trim in the interior of a door panel. In the automobile door trim 1, a surface skin member 3 is integrally attached to the surface of a resin core member 2 formed to a desired curved shape, and an end of the peripheral rim 3a of the surface skin member 3 is folded over the back of the resin core member 2 at the entire length or part of the peripheral rim of the product for finishing.

As a manufacturing method for the automobile door trim 1, a cold-press molding, a mold-press molding, or other molding methods can be used. The cold-press molding method will be described as an example. First, as shown in FIG. 11, when cold-press molding upper and lower molds (an upper mold 4 and a lower mold 5) are opened, a surface skin conveying unit 6 on which the surface skin member 3 is placed is brought into the cold-press molding upper and lower molds 4 and 5, and the surface skin member 3 is elevated with the motion of a cylinder (not shown) built in the surface skin conveying unit 6, and is retained with a support pin 4a of the upper mold 4.

A thermoplastic resin plate P that is a material of the resin core member 2 being softened by heat, is placed on the die surface of the lower mold 5 prior to supplying the surface skin member 3. As shown in FIG. 12, by closing the upper and lower molds 4 and 5 each other, the resin core member 2 having a desired shape is molded from the thermoplastic resin plate P, and at the same time, the surface skin member 3 is integrally attached to the surface of the resin core member 2.

In this instance, an excessive tensile force is applied to the folded part 3a of the surface skin member 3 held by the support pin 4a as the upper mold 4 moves downward.

Accordingly, recently, a surface skin holding means 7 shown in FIG. 13 is proposed in order to prevent the excessive tensile force from being applied to the surface skin member 3, particularly, to the folded part 3a when the cold-press molding is executed with the cold-press molding upper and lower molds 4 and 5.

In this mechanism, a support frame 7a is supported by a support post 7b. The support post 7b penetrates in a through hole 5a of the lower mold 5, and can be vertically moved. The support frame 7a is constantly urged upward with an urging spring 7c folded over an outer periphery of the support post 7b. When the support frame 7a is pressed downwardly, the support frame 7a moves downward if a pressing force larger than a spring force of the urging spring 7c is applied.

In addition, when the surface skin member 3 is placed, the support frame 7a is elevated to a position forming the same plane as the die surface of the lower mold 5, and when the support frame 7a is at the elevated position, the surface skin member 3 is placed.

As shown in FIG. 14, when the upper mold 4 moves downward to the bottom dead center, and the resin core member 2 and the surface skin member 3 are integrated by closing the upper and lower molds 4 and 5 each other, the folded part 3a of the surface skin member 3 is held by the support frame 7a and the support pin 4a, and is subjected to an appropriate tensile force with the spring force of the urging spring 7c.

However, when the surface skin holding means 7 comprising the support frame 7a, the support post 7b, and the urging spring 7c is used, as shown in FIG. 15 for example, if the upper mold 4 moves upward after completion of press-molding, the urging spring 7c is released from an external force, so that the support frame 7a is elevated to the uppermost position with the spring force of the urging spring 7c. In this instance, since a laminated assembly a is positioned on the die surface of the lower mold 5, an excessive load is applied to a peripheral rim 2a of the resin core member 2 from the folded part 3a of the surface skin member 3, and as a result, a problem occurs in that the folded part 3a of the surface skin member 3 is peeled off at the position indicated as X.

Also, after the upper mold 4 moves upward, as shown in FIG. 16, the laminated assembly a is pushed up from the lower mold 5 with the pushing-up motion of an ejector pin 5b; however, in this case as well, an excessive load is applied to the peripheral rim 2a of the resin core member 2 from the folded part 3a of the surface skin member 3, thereby the folded part 3a is liable to peel off at the position indicated as X.

Accordingly, in the surface skin holding means 7, although an appropriate tensile force is applied to the surface skin member 3 with the urging spring 7c, an excessive load is applied to the base of the folded part 3a of the surface skin member 3 when the dies are opened after molding and when the surface skin member 3 is pushed up with the ejector pin 5b, with the result that problems occur in that the folded part 3a is peeled off and also a highlighted line cannot be clearly formed, thereby the appearance of the outline of the product is injured.

SUMMARY OF THE INVENTION

The present invention has been made in consideration of the above problems, and accordingly, it is an object of the present invention to provide a method for molding a laminated assembly and an apparatus, in which a surface skin member has a folded part at a peripheral rim, wherein when press-molding is executed, the surface skin member is subjected to an appropriate tensile force, so that molding property can be preferably maintained, and also when the dies are opened after molding and when the molded product is pushed up, no excessive load is applied to a base of the folded part of the surface skin member, and consequently, peeling off of the surface skin member can be remarkably prevented.

In order to accomplish the above objects, according to the present invention, there is provided a method for molding a laminated assembly, in which a surface skin member is integrally attached to the surface of a resin core member and a folded part of the surface skin member is folded over the entire length or part of a peripheral rim of the resin core member, wherein the surface skin member is placed above the resin material of the resin core member supplied to a die surface of a lower mold, and when press molding is executed, the folded part of the surface skin member is held with a surface skin holding means provided corresponding thereto, and after completion of the molding, the surface skin holding means moves upward in cooperation with a pushing-up motion of ejector means disposed at the lower mold so as to enable the folded part of the surface skin member to follow the laminated assembly.

As the molding method, there are a cold-press molding method and a mold-press molding method.

In the cold-press molding method, a polypropylene resin plate in which wood meal is mixed is extruded to form a sheet with a T-die extruder, and after the sheet plate is subjected to a hot softening process with a heater and is placed on a cold-press-molding lower mold, it is integrally molded together with the surface kin member supplied into the die by cold-press molding.

In addition, in the mold-press molding method, after the surface skin member is placed in the die, a molten resin is distributed on the die surface of a mold-press-molding lower mold through a hot runner and a gate, and the mold-press molding upper and lower molds are closed each other, thereby integrally molding the resin core member and the surface skin member.

Next, the apparatus for molding a laminated assembly according to the present invention comprises the upper and lower molds for integrally attaching the surface skin member to the surface of the resin core member, the ejector means provided in the lower mold and for pushing up the molded product, and the surface skin holding means provided for the lower mold and respectively corresponding to support pins provided along the peripheral rim of the upper mold, wherein each of the surface skin holding means includes a planar support frame for supporting the peripheral rim of the surface skin member, a support post for supporting the support frame, penetrating in a through hole of the lower mold, and pushed up by an elevating motion of an ejector plate, and a post retaining mechanism for retaining the support post at an elevated position of the support frame.

As the surface skin holding means for holding the peripheral rim of the surface skin member, there are provided the planar support frame provided for the lower mold and corresponding to the support pin provided at the peripheral rim of the upper mold, and the support post attached to the lower surface of the support frame, penetrating in the through hole of the lower mold in a manner so as to be freely and vertically moved, and pushed up with the elevating motion of the ejector plate. As the support-post retaining means at the elevated position, any system capable of locking at a specified position, such as a ball-plunger system and a latch system, can be used.

Therefore, according to the present invention, after the resin core member and the surface skin member have been integrally press-molded, even if the upper mold moves upward, the surface skin holding means does not move upward, so that no load is applied to the folded part of the surface skin member.

In addition, when the laminated assembly is pushed up with the ejector means of the lower mold, the surface skin holding means moves upward in cooperation with the ejector means; therefore, no load is applied to the folded part of the surface skin member even when the laminated assembly is pushed up.

Furthermore, when the surface skin holding means is at the elevated position, even if the ejector pin is accommodated in the lower mold with the support-post retaining means such as the ball plunger, the surface skin holding means is retained at the elevated position, and consequently, the surface skin member can be smoothly placed.

DESCRIPTION OF THE PREFERRED EMBODIMENTS

Figure 1:
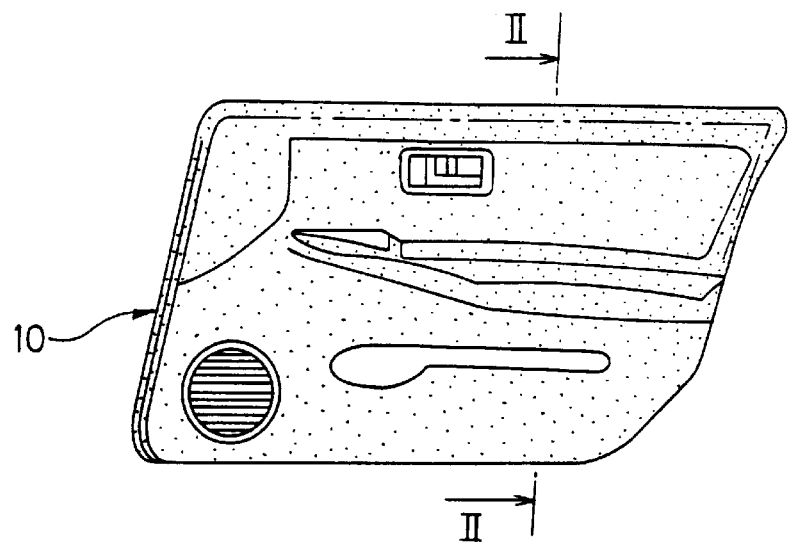
FIG. 1 is a front view of an automobile door trim showing an embodiment of a laminated assembly according to the present invention.

Referring to the drawings, embodiments of a method for molding a laminated assembly and an apparatus according to the present invention will be described hereinbelow.

Figure 2:
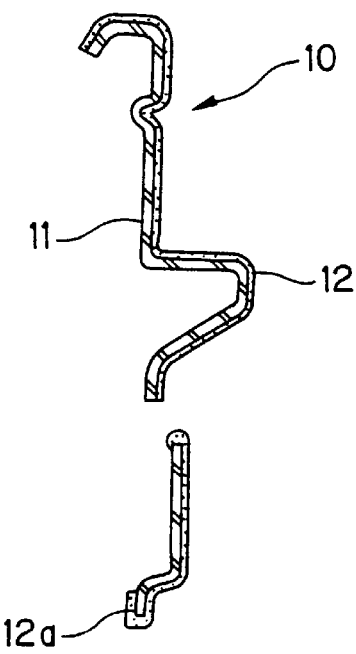
FIG. 2 is a cross-sectional view taken on line II—II in FIG. 1.
Figure 3:
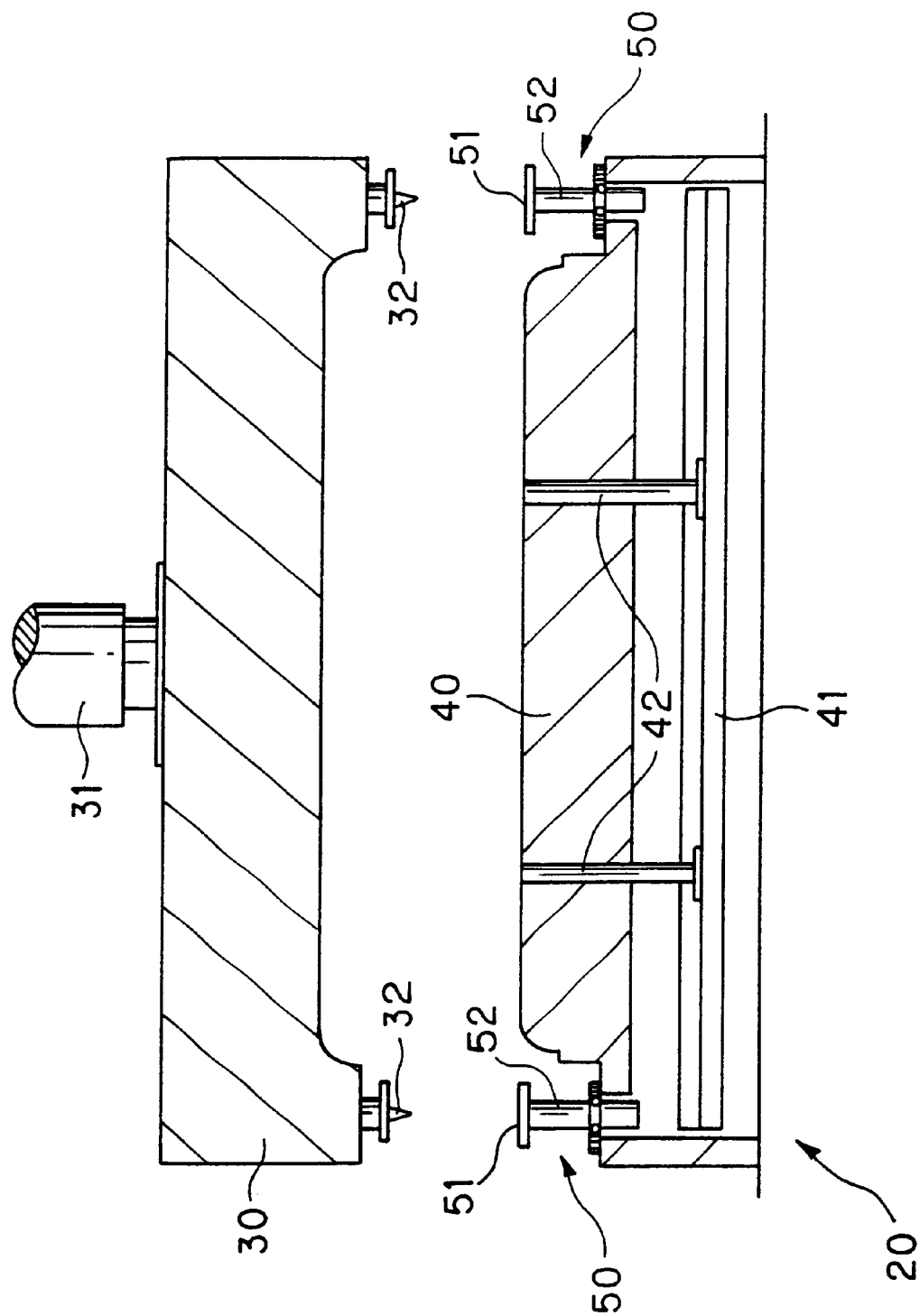
FIG. 3 is an explanatory view showing a schematic structure of a cold-press molding apparatus used in the present invention.
Figure 4:
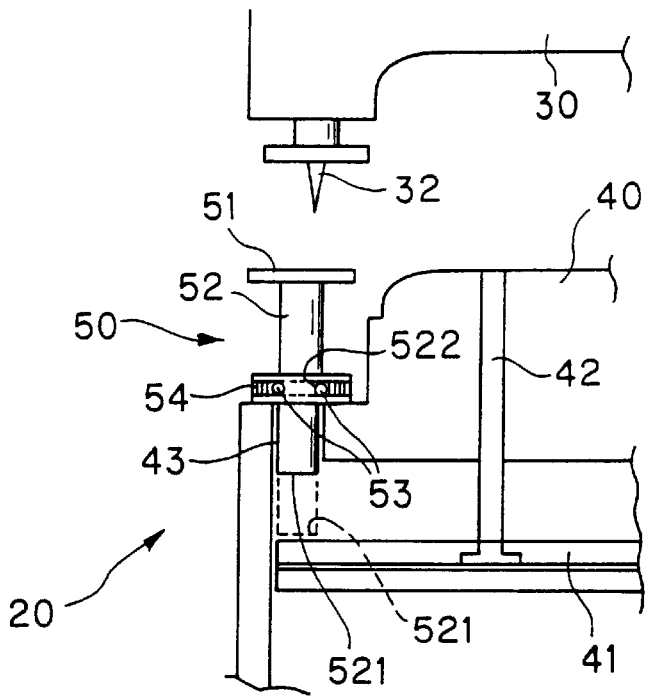
FIG. 4 is an explanatory view showing a surface skin holding means in the cold-press molding apparatus in FIG. 3.

FIG. 1 is a front view showing an automobile door trim as an embodiment of a laminated assembly according to the present invention; FIG. 2 is a cross-sectional view thereof; FIG. 3 is a structural schematic view showing an embodiment of an apparatus for molding a laminated assembly according to the present invention; and FIG. 4 is an enlarged view showing essential parts of the molding apparatus in FIG. 3.

Figure 7:
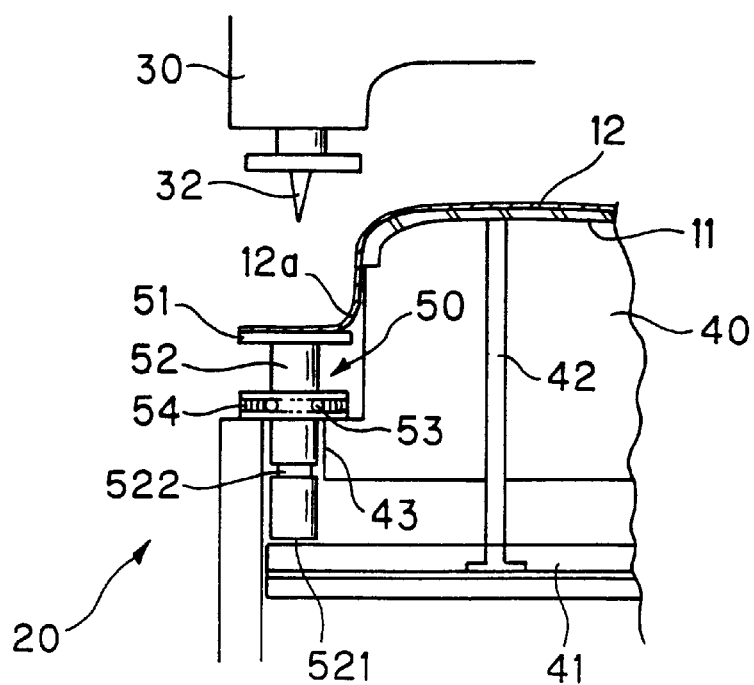
FIG. 7 is an explanatory view showing a state when an upper mold is elevated after completion of press molding in the manufacturing method for the automobile door trim in FIG. 1.
Figure 8:
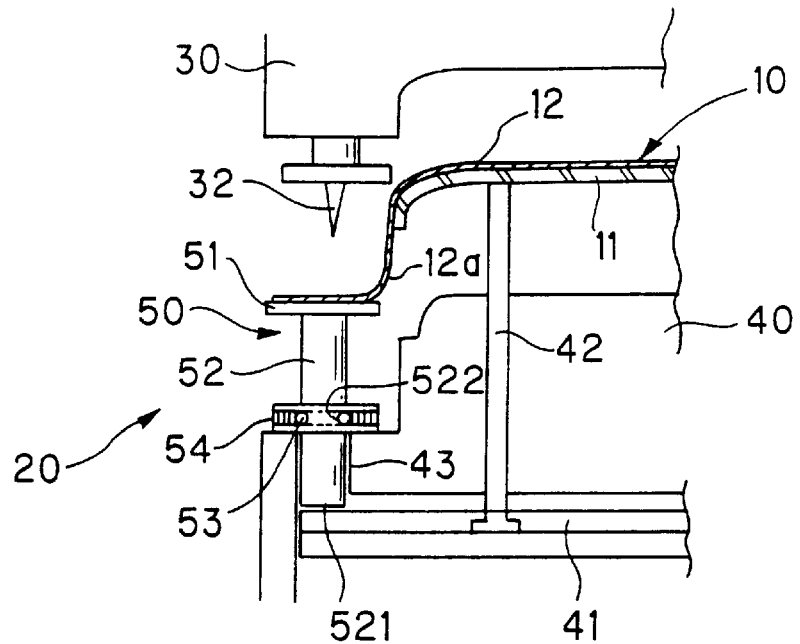
FIG. 8 is an explanatory view showing a state when the product is pushed up in the manufacturing method for the automobile door trim in FIG. 1.
Figure 9:
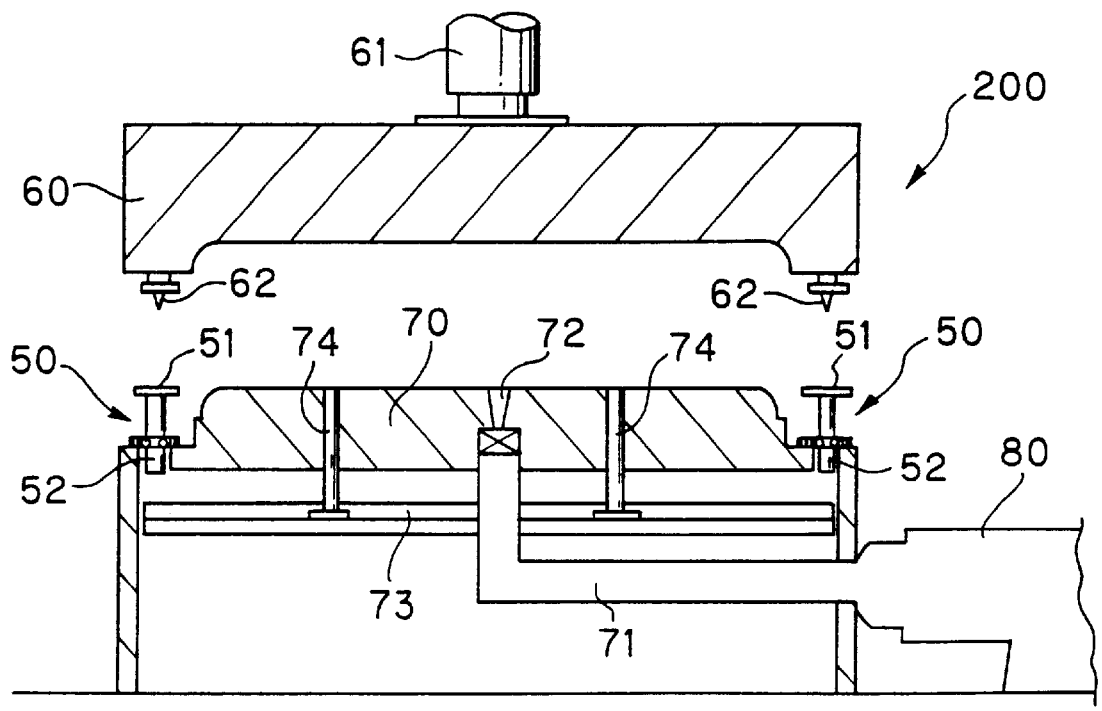
FIG. 9 is a schematic view showing the structure of a mold-press molding apparatus in which the method according to the present invention is applied to the mold-press molding method.
Figure 10:
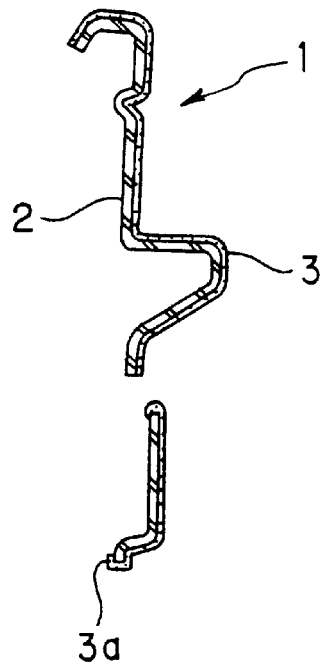
FIG. 10 is a cross-sectional view showing the structure of a conventional automobile door trim.
Figure 11:
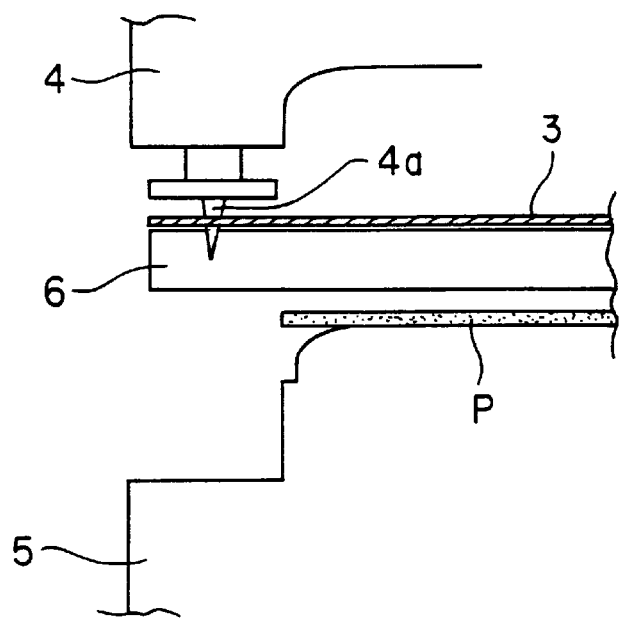
FIG. 11 is an explanatory view showing a process of placing the surface skin in a conventional molding method for the automobile door trim.
Figure 12:
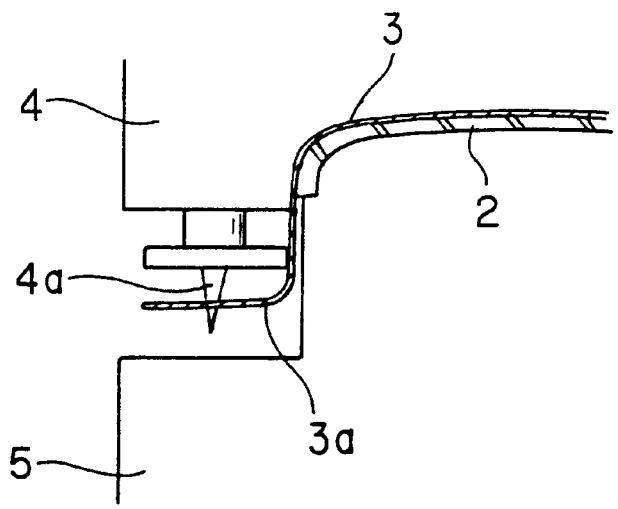
FIG. 12 is an explanatory view showing a press-molding process in the conventional molding method of the automobile door trim.
Figure 13:
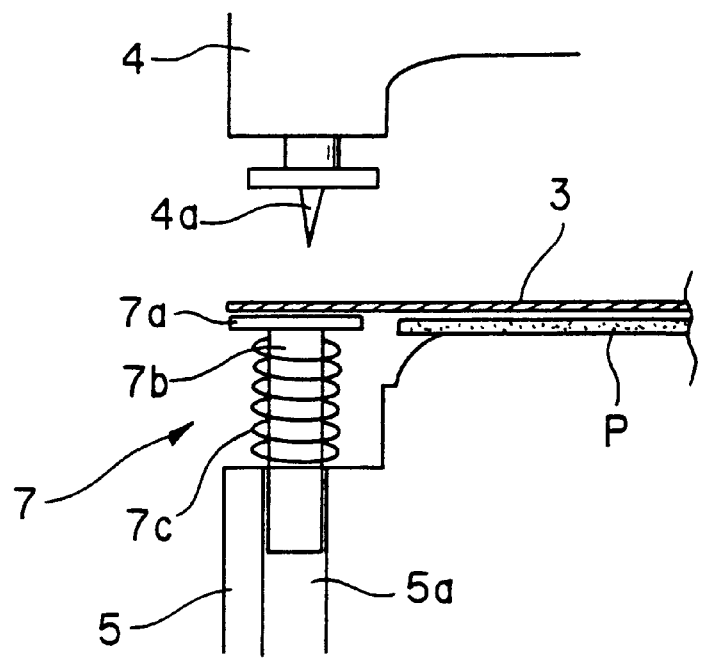
FIG. 13 is an explanatory view showing a conventional example of a surface skin holding means in the conventional molding apparatus of the automobile door trim.
Figure 14:
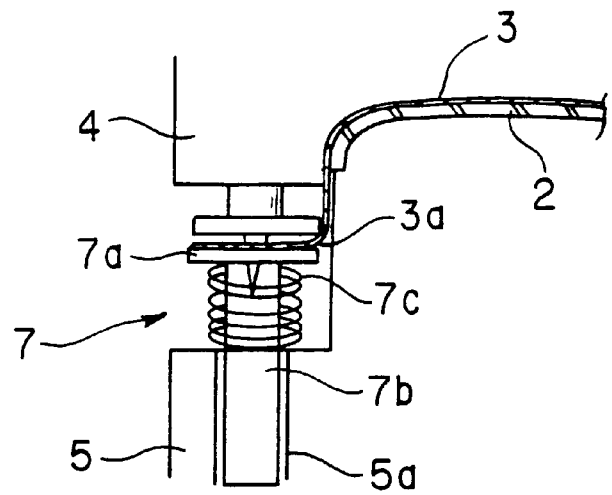
FIG. 14 is an explanatory view showing the molding process in the surface skin holding means in FIG. 13.
Figure 15:
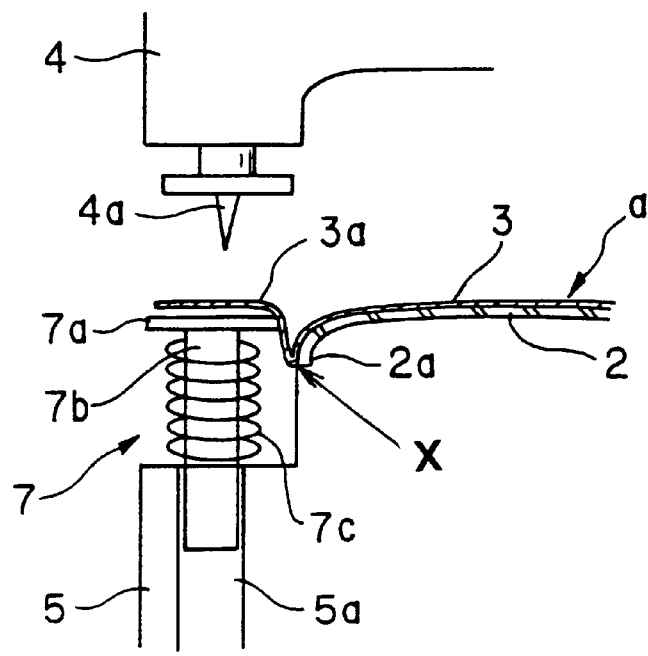
FIG. 15 is an explanatory view showing a state when an upper mold is elevated in the conventional surface skin holding means.
Figure 16:
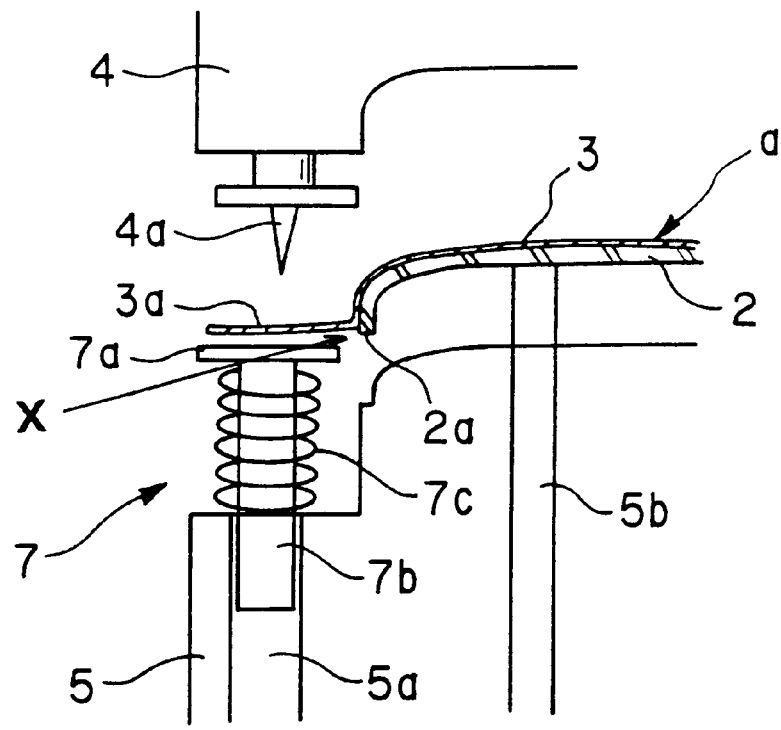
FIG. 16 is an explanatory view showing a state when the product is pushed up.

In addition, FIGS. 5 to 8 are process views showing an embodiment in which the method of the present invention is applied to an automobile-door-trim molding method, and FIG. 9 is a schematic view showing a molding apparatus in which the method of the present invention is a mold-press molding method.

In FIGS. 1 and 2, an automobile door trim 10 has a form-retaining property and a mounting rigidity to a door panel and is formed from a laminate of a resin core member 11 molded into a desired curved shape and a surface skin member 12 integrally attached to the surface of the resin core member 11 and having a cushioning property and a preferable designing property. A folded part 12a is provided along both side rims and a lower rim of the entire length of the peripheral rim of the surface skin member 12. The folded part 12a is folded over and attached to the back of the resin core member 11. In this manner, the automobile door trim 10 is constructed.

According to the present invention, a problem that the folded part 12a is peeled off in the automobile door trim 10 can be effectively solved, and also the shape of a corner line of the peripheral rim can be clearly formed, having an excellent designing property in appearance.

Next, as a molding method for the automobile door trim 10, according to an embodiment using a cold-press molding method, the outline of the cold-press molding apparatus will be described in FIGS. 3 and 4, and the processes of the cold-press molding method will be described in FIGS. 5 to 8.

First, as shown in FIG. 3, a cold-press molding apparatus 20 generally comprises a cold-press-molding upper mold 30 that is vertically movable at a specified stroke, a cold-press-molding lower mold 40 which is not movable and is in pairs with the upper mold 30, and a surface skin holding means 50 provided along the peripheral rim of the lower mold 40.

More specifically, the upper mold 30 can be vertically moved at a specified stroke by an elevating cylinder 31, in which support pins 32 penetrating to the surface skin member 12 from the face of the surface skin member and each having a sharp tip are provided at the entire peripheral rim or part of the upper mold 30.

On the other hand, the lower mold 40 has an ejector means therein. That is, an ejector plate 41 is provided in a manner so as to be vertically moved by a cylinder and the like (not shown) in order to push up the molded product after press molding, and a plurality of ejector pins 42 driven by the ejector plate 41 are accommodated in the lower mold 40 and push up the molded product by an elevating motion thereof.

Furthermore, surface skin holding means 50 disposed at the lower mold 40 are provided at positions corresponding to the support pins 32 of the upper mold 30, which comprises planer support frames 51 and support posts 52 each extending downwardly from the bottom of the support frame 51 for supporting the support frame 51. Each of the support posts 52 inserts into a through hole 43 of the lower mold 40 in a manner so as to be vertically moved, and a lower end 521 of the support post 52 comes into contact with an upper surface of the ejector plate 41 or faces the nearest position thereof when coming down to the lowermost position; accordingly, the support post 52 performs the elevating motion in cooperation with the elevating motion of the ejector plate 41.

Furthermore, the support post 52 has a post retaining means for retaining at the uppermost position when reaching there. That is, a peripheral groove 522 is formed around the peripheral surface corresponding to a slightly upper position than a die surface of the lower mold 40 in a peripheral direction when the support post 52 is at the uppermost position, and balls 53 fitted in the peripheral groove 522 are provided at facing positions at 180 degrees in a manner so as to be urged to the support post 52 side with springs 54. That is, the balls 53 and the springs 54 construct a ball-plunger means.

Accordingly, when the support frame 51 is at the uppermost position, that is, when the skin material is placed, the surface skin holding means 50 in the lower mold 40 is retained at the position with the ball-plunger mechanisms 53 and 54, and when the upper and lower molds 30 and 40 are closed each other, the support frame 51 is pushed downward with the support pin 32 of the upper mold 30, so that the lower end 521 of the support post 52 is pushed downward to come into contact with the ejector plate 41 or to come to the nearest position thereof. After molding, when the ejector means 41 and 42 operate, the support post 52 is pushed upward with the ejector plate 41, and when the support frame 51 reaches the uppermost position, the support post 52 is retained and locked at the uppermost position with the ball-plunger mechanisms 53 and 54.

Figure 5:
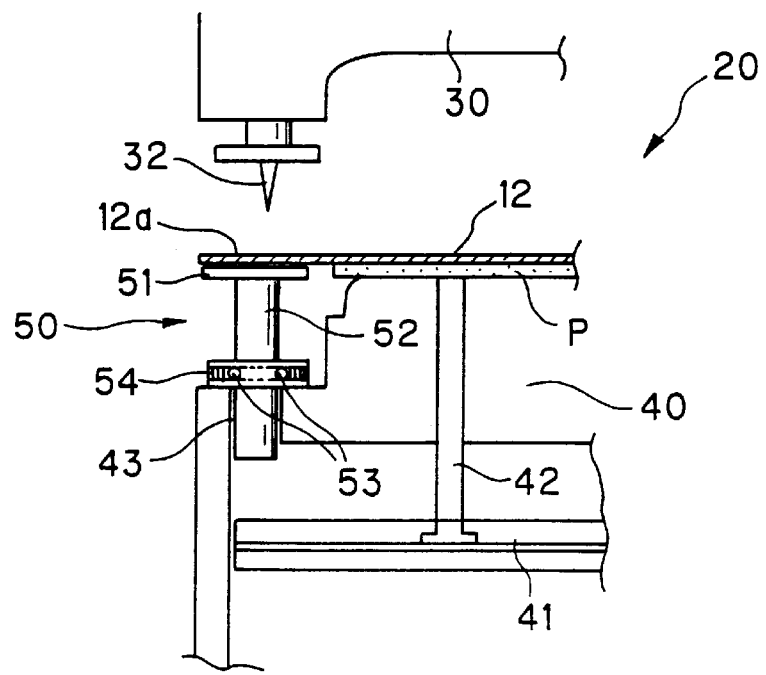
FIG. 5 is an explanatory view showing a process of placing a surface skin member in a manufacturing method for the automobile door trim in FIG. 1.

Next, a process of molding the automobile door trim 10 in which the cold-press molding apparatus 20 shown in FIGS. 3 and 4 is used, will be described. As shown in FIG. 5, when the upper and lower molds 30 and 40 are opened, a PP (polypropylene) composite resin plate P that is a material of the resin core member 11 is placed on the die surface of the lower mold 40 in a heated and softened state, and the surface skin member 12 (foam vinyl chloride sheet in this embodiment) is placed thereon.

In this instance, the support frame 51 in the surface skin holding means 50 is at almost the same plane as the die surface of the cold-press molding lower mold 40, so that the surface skin member 12 can be placed flat without a difference in height, and accordingly, the placing operation can easily be performed.

Figure 6:
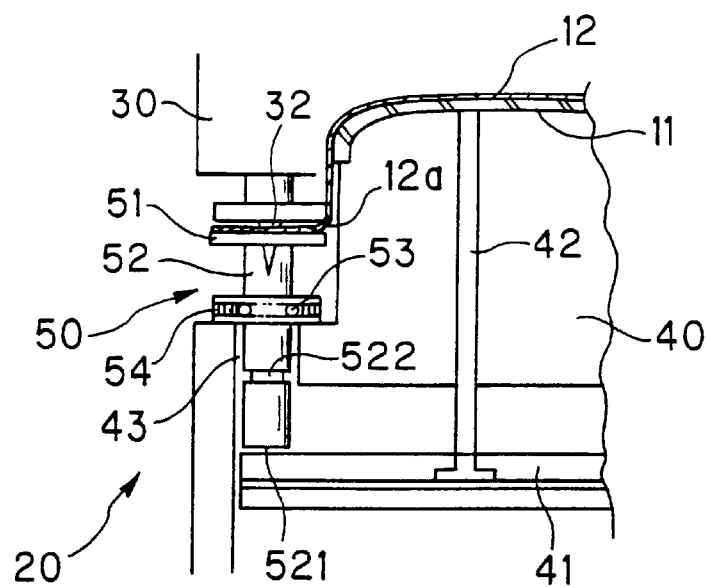
FIG. 6 is an explanatory view showing a molding process in the manufacturing method for the automobile door trim in FIG. 1.

Subsequently, as shown in FIG. 6, as the elevating cylinder 31 operates, the upper mold 30 comes down to the bottom dead center to mold the composite resin plate P into a desired curved shape and to perform integral press molding of the resin core member 11 and the surface skin member 12. In this instance, as shown in the drawing, the folded part 12a that is the peripheral rim of the surface skin member 12 is on the support frame 51 and is firmly held, without coming out, in a state in which the support pin 32 is inserted.

After completion of the press molding, as shown in FIG. 7, the upper mold 30 moves upward with the motion of the elevating cylinder 31. In this instance, since the support post 52 in the surface skin holding means 50 is retained with the balls 53 urged by the springs 54 and is stopped at the position when molding, a load is not applied to the folded part 12a of the surface skin member 12, and as a result, the folded part 12a is not peeled off or the like.

Subsequently, the door trim 10 is taken off from the lower mold 40. As shown in FIG. 8, as the ejector plate 41 is elevated by the motion of the cylinder (not shown), the door trim 10 is pushed up with the ejector pin 42, and accordingly, the ejector plate 41 comes into contact with the lower end 521 of the support post 52 and raises it, and the folded part 12a on the support frame 51 will follow the motion of the door trim 10. In this instance, if the stroke of the vertical motion of the ejector plate 41 and the position of the peripheral groove 522 formed in the support post 52 are appropriately adjusted, the balls 53 are fitted in the peripheral groove 522 of the support post 52 at the uppermost position of the support post 52.

Accordingly, also when the door trim 10 is pushed up, no load is applied to the folded part 12a of the surface skin member 12.

In this way, if the cold-press molding apparatus according to the present invention is used, after the resin core member 11 and the surface skin member 12 are subjected to the cold-press molding, no load is applied to the base of the folded part 12a of the surface skin member 12 when the upper mold 30 moves upward and when the door trim 10 is pushed up, so that the surface skin member 12 is not peeled off, and a sharp shape of a highlighted line can be provided, thereby improving productivity and also preferably maintaining the appearance of the peripheral rim.

Next, FIG. 9 shows a mold-press molding apparatus 200 in which the mold-press molding method is used as the method for molding a laminated assembly. The mold-press molding apparatus 200 includes a mold-press molding upper mold 60 that can be vertically moved at a specified stroke, a mold-press molding lower mold 70 having a die surface of almost the same shape as that of the mold-press molding upper mold 60, and an injection molding device 80 connecting to the mold-press molding lower mold 70.

Similarly, the mold-press molding upper mold 60 includes an elevating cylinder 61 and support pins 62. The mold-press molding lower mold 70 includes a hot runner 71 and a gate 72 as a supply path for the resin core member 11, and also the surface skin holding means 50 as in FIG. 3 at positions corresponding to the support pins 62 of the upper mold 60. The support post 52 in the surface skin holding means 50 is operated by the vertical motion of an ejector plate 73 that is an ejector means of the mold-press molding lower mold 70. In addition, reference numeral 74 denotes an ejector pin.

Accordingly, also when the mold-press molding apparatus 200 is used, after a molten resin M (a material for the resin core member 11) has been supplied from the injection molding device 80 through the hot runner 71 and the gate 72 and the molding-press has been completed, when the mold-press molding upper mold 60 moves upward and also the ejector means 73 and 74 operate, the surface skin holding means 50 operates in cooperation with the ejector means 73 and 74, so that the base of the folded part 12a of the surface skin member 12 that is placed prior to the supply of the molten resin M, is subjected to no load, as in the above-described embodiment. Accordingly, peeling off of the folded part 12a of the surface skin member 12 can be prevented as much as possible, the highlighted line of the peripheral rim of the product can be accentuated, and a preferable appearance of the product can be realized.

As described above, according to the present invention, there are provided the method for molding a laminated assembly having the resin core member and the surface skin member, in which the surface skin member has the folded part formed at the entire length or the part of the peripheral rim thereof, the folded part being folded over the back of the resin core member, wherein the surface skin holding means in the lower mold for holding the folded part of the surface skin member operates in cooperation with the ejector means provided for the lower mold, so that no load is applied to the folded part of the surface skin member, and consequently, peeling off of the folded part of the surface skin member can be reliably prevented, productivity can be improved, and also the sharp shape of the highlighted line of the corner of the product can be faithfully realized, thereby preferably maintaining the appearance of the peripheral rim.

What is claimed is:

1. An apparatus for molding a laminated assembly comprising:
    an upper mold and a lower mold for integrally attaching a surface skin member to the surface of a resin core member;
    an ejector means provided in said lower mold, for pushing up a molded product; and
    a surface skin holding means provided for said lower mold corresponding to support pins provided along the peripheral rim of said upper mold,
    wherein, said surface skin holding means comprises:
        a planar support frame for supporting the peripheral rim of said surface skin member;
        a support post for supporting said support frame, penetrating in a through hole of said lower mold, and pushed up with the elevating motion of a ejector plate; and
        a support-post retaining means for retaining said support post at an elevated position of said support frame.

2. An apparatus for molding a laminated assembly according to claim 1, wherein said support-post retaining means is a ball-plunger mechanism, comprising:
    a plurality of balls fitted in a peripheral groove of said support post, for locking said support groove; and
    a spring for urging said balls to said support post.

* * * * *